United States Patent Office 2,834,551
Patented May 13, 1958

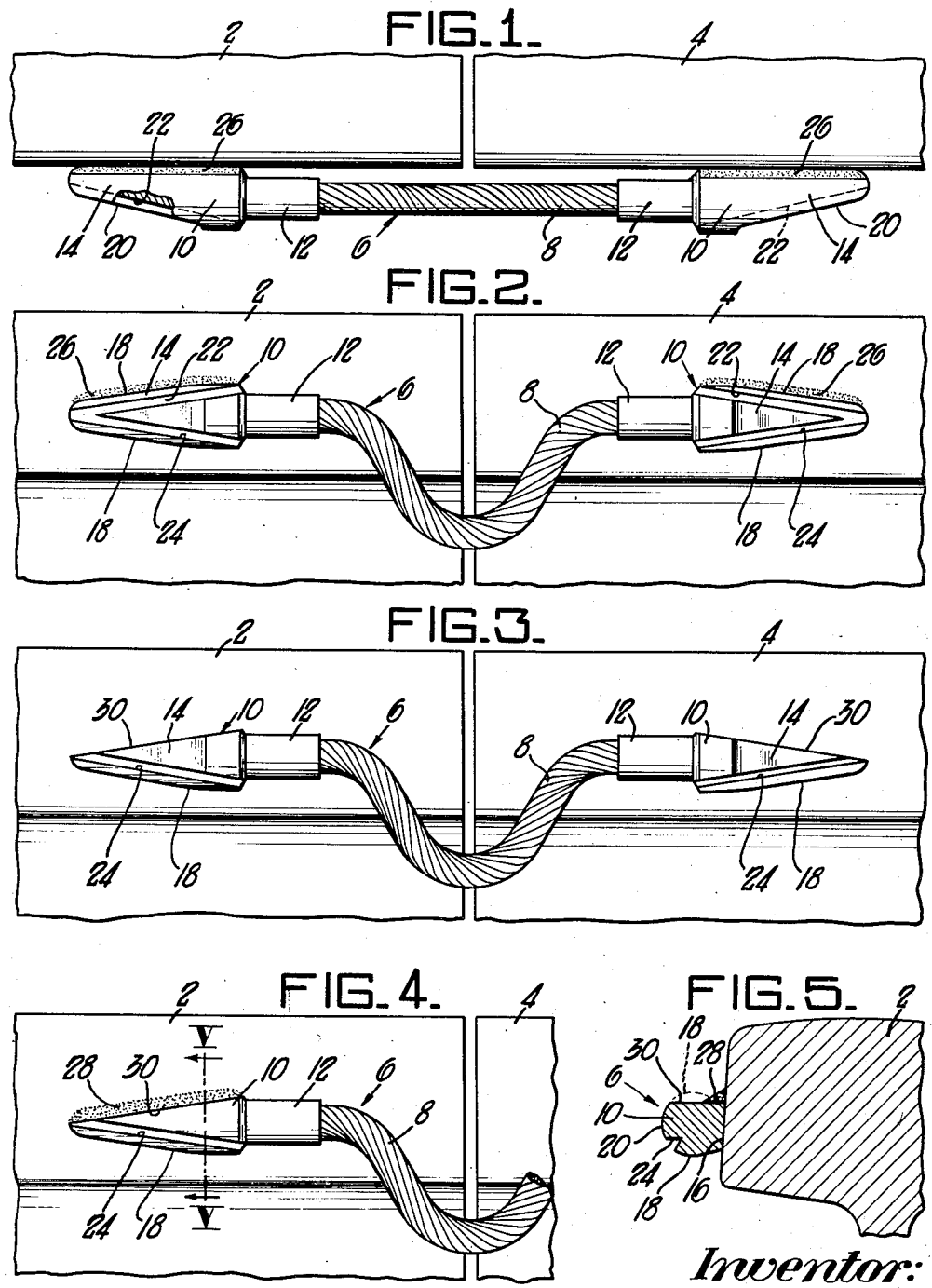

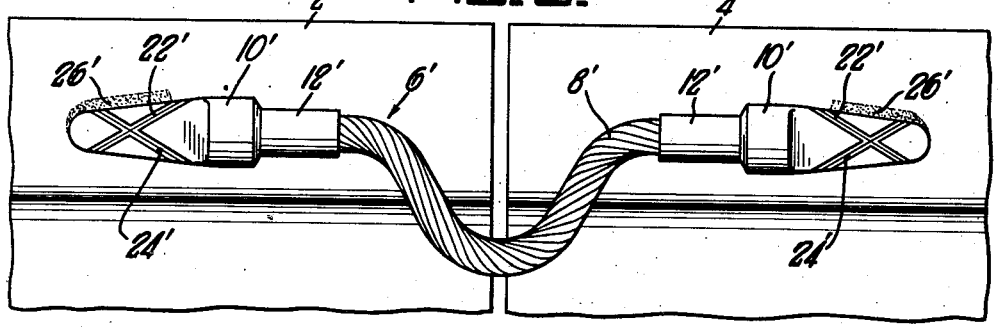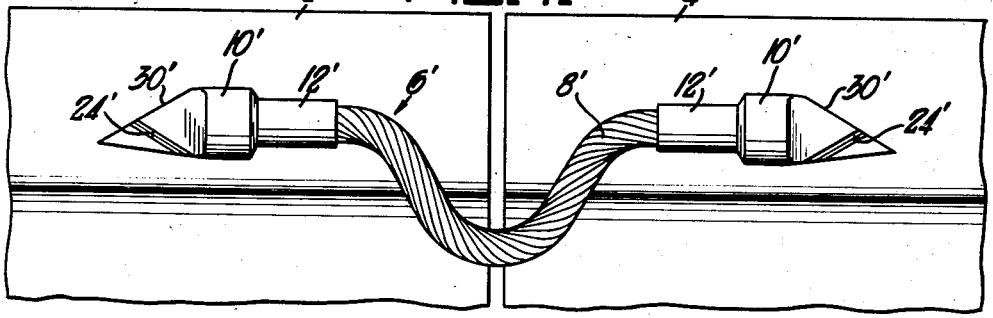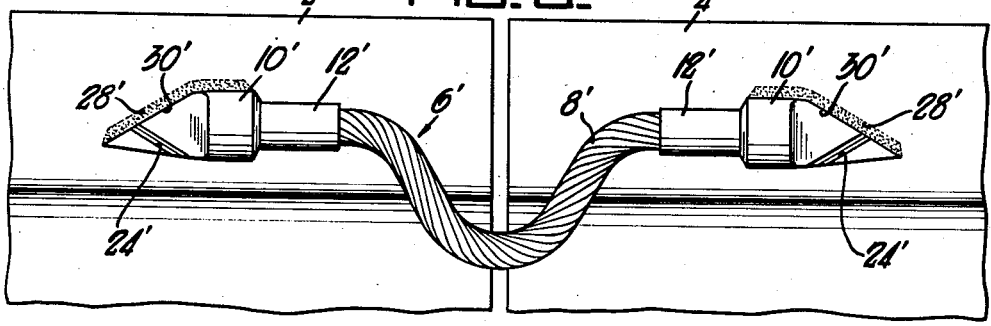

2,834,551

ARC WELD RAIL BOND

Merrill F. Black, Denver, Colo., assignor to United States Steel Corporation, a corporation of New Jersey Application October 27, 1953, Serial No. 388,481

1 Claim. (Cl. 238—14.13)

This invention relates to a rail bond and more particularly to a bond which is adapted to be fastened to the rails by welding. Bonds of this general type are well known, but those in present use have the disadvantage that they are difficult to remove from the rail and when removed cannot be reused because of damage incurred in the removal.

It is an object of my invention to provide an arc weld rail bond which can be readily removed from the rail and which can be reused after removal.

This and other objects will be more apparent after referring to the following specification and attached drawings, in which:

Figure 1 is a top plan view of a rail with the rail bond of my invention welded thereto;

Figure 2 is a front elevation of Figure 1;

Figure 3 is a view, similar to Figure 2, showing the rail bond after removal from the rail in position to be attached to a second pair of rails;

Figure 4 is a front elevation showing one terminal of the bond of Figure 3 welded to a rail;

Figure 5 is a sectional view taken on the line V—V of Figure 4;

Figure 6 is a view, similar to Figure 2, showing a second embodiment of my invention;

Figure 7 is a view, similar to Figure 6 showing the rail bond after removal from the rail in position to be attached to a second pair of rails; and Figure 8 is a view, similar to Figure 7, showing the rail bond welded to the rail.

Referring more particularly to the drawings, reference numerals 2 and 4 indicate the ends of adjacent rails between which it is desired to carry an electrical current. The current is carried by the rail bond 6 of my invention. As shown in Figures 1 and 2 bond 6 consists of a conductor 8 and two terminal fittings 10. Each terminal fitting 10 includes a sleeve portion 12 for receiving an end of the conductor 8 and an elongated body portion 14. Body portion 14 has a flat inner surface 16 which is adapted to contact the rail, side portions 18 extending outwardly therefrom and a tapered outer surface 20. As best shown in Figure 5 a pocket is provided between the rail and the side portion of the terminal fitting. The outer portion of the fitting is provided with two diagonal grooves 22 and 24 which converge from the end adjacent the sleeve 12 toward the opposite end of the fitting. When the rail bond is first attached to the rail a fillet weld 26 is provided in the pocket between the rail and the sides 18 of the fitting, this weld extending only between the ends of the groove 22, as best shown in Figure 2. When it is desired to remove the rail bond from the rail for any purpose it is only necessary to place a chisel in the groove 22 which forms a plane of weakness, and cut the fitting from the rail with that part of the fitting between the weld and the groove 22 remaining on the rail. The rail bond will then be reused in the manner shown in Figures 3, 4 and 5. As there shown, a fillet weld 28 is provided between the rail and the side 30 of the fitting formed by the chisel in cutting the fitting from the rail. While two grooves 22 and 24 are shown, only one groove need be used. The purpose of using two grooves is to eliminate the need of making the fittings 10 right and left hand, thus decreasing the cost of production of the rail bond.

Figures 6, 7 and 8 disclose a somewhat different embodiment of my invention. In this embodiment the rail bond 6' consists of a conductor 8' and two terminal fittings 10'. The shape of the terminal fittings 10' is essentially the same as that of the fitting 10, the main difference being in the construction of the grooves 22' and 24'. As shown in Figure 6 these grooves 22' and 24' are arranged as a cross rather than as a V, but like the grooves 22 and 24 they converge toward the end of the fitting remote from the sleeve 12'. In assembling the rail bond initially on the rail a fillet weld 26' is provided in the pocket between the rail and the bond. This weld, like that of the weld 26 of the first embodiment, extends only between the ends of the groove 22'. When it is desired to remove the rail bond it is done in the same manner as in the first embodiment by inserting a chisel in the groove 22'. When the rail bond is reused fillet weld 28' attaches the bond to the rail as shown in Figure 8.

While several embodiments of my invention have been shown and described it will be apparent that other adaptations and modifications may be made without departing from the scope of the following claim.

I claim:

A rail bond comprising a conductor and a pair of terminal fittings, each of said fittings including a sleeve portion for attachment to one end of said conductor and an elongated body portion extending from said sleeve, said body portion having a flat surface and a portion extending outwardly therefrom so as to form a pocket for receiving weld metal when the fitting is against the rail, said body portion having a pair of intersecting diagonal grooves therein on the side thereof opposite the flat surface and away from the pocket, said grooves intersecting at a point remote from said conductor, one of said grooves extending from the point of intersection upwardly toward the end of the body portion adjacent the conductor and the other of said grooves extending from the point of intersection downwardly toward the end of the body portion adjacent the conductor, said grooves being adapted for selectively receiving a chisel to cut the fitting from the rail.

References Cited in the file of this patent

UNITED STATES PATENTS

| | | |
|---|---|---|
| 517,580 | Livingston | Apr. 3, 1894 |
| 658,598 | Stevens et al. | Sept. 25, 1900 |
| 1,806,188 | Adams | May 19, 1931 |
| 1,944,366 | Pipes | Jan. 23, 1934 |
| 2,201,497 | Mosebach | May 21, 1940 |
| 2,443,000 | Elkins | June 8, 1948 |
| 2,477,765 | Nelson | Aug. 2, 1949 |
| 2,711,798 | Aversten | June 28, 1955 |